United States Patent [19]

Cartwright

[11] 4,274,884
[45] Jun. 23, 1981

[54] METHOD OF REMOVING WALLPAPER

[75] Inventor: Jeffery Cartwright, Newton Abbot, England

[73] Assignee: Sterling Winthrop Group Limited, London, England

[21] Appl. No.: 35,299

[22] Filed: May 2, 1979

Related U.S. Application Data

[63] Continuation-in-part of Ser. No. 875,930, Feb. 7, 1978, abandoned.

[30] Foreign Application Priority Data

Jul. 30, 1977 [GB] United Kingdom ............... 32100/77

[51] Int. Cl.³ ............................................... B08B 7/04
[52] U.S. Cl. ........................................... 134/4; 134/6; 134/38; 134/42; 156/344; 252/DIG. 8
[58] Field of Search ............................ 134/4, 6, 38, 42; 252/162, 163, 164, 165, 170, 171, DIG. 8; 156/344

[56] References Cited

U.S. PATENT DOCUMENTS

| | | | |
|---|---|---|---|
| 1,974,744 | 9/1934 | Klinkenstein | 252/DIG. 8 X |
| 2,052,884 | 9/1936 | Leatherman | 156/344 |
| 2,479,628 | 8/1949 | Kuentzel | 252/DIG. 8 X |
| 2,495,729 | 1/1950 | Hutson et al. | 134/4 |
| 3,179,609 | 4/1965 | Morison | 252/DIG. 8 X |
| 3,355,385 | 11/1967 | Mackley | 252/DIG. 8 X |
| 3,574,123 | 4/1971 | Laugle | 134/38 X |
| 3,663,447 | 5/1972 | Murphy | 134/38 X |
| 3,829,387 | 8/1974 | Wise et al. | 252/162 X |
| 3,983,047 | 9/1976 | Vinson | 252/DIG. 8 X |
| 3,998,654 | 12/1976 | Falaas et al. | 134/38 X |
| 4,092,175 | 5/1978 | Martin | 134/42 |

*Primary Examiner*—Marc L. Caroff
*Attorney, Agent, or Firm*—Cushman, Darby & Cushman

[57] ABSTRACT

A composition containing organic compounds for plasticizing resins, an emulsifying agent, a thickening and suspending agent and possibly an inert filler and/or water, is applied to an emulsion-painted wallpaper surface and left for several hours to allow the compounds to act on the binder resins in the paint coating. The resulting cohesive, plasticized paint film may then be removed by scoring and removing strips of the film and adhering wallpaper, starting from the score mark, any remaining paint and underlying paper being removed by scraping after possible application of water.

19 Claims, No Drawings

METHOD OF REMOVING WALLPAPER

This application is a continuation-in-part application to my application Ser. No. 875,930 filed on Feb. 7, 1978, now abandoned.

BACKGROUND TO THE INVENTION

The present invention relates to a painted wallpaper remover incorporating an organic compound capable of plasticizing emulsion paint or the like.

Wallpapers coated with a water-resistant emulsion paint or like substance are extremely difficult to remove since the coating prevents penetration of water, even aided by the surfactants usually present in wallpaper removers, into the paper to soften the paper and backing adhesive to allow its removal from the wall. Until now tedious and laborious methods, such as scoring and scrubbing with a wire brush, have had to be employed to break the surface prior to applicaton of water, to allow penetration of the latter into the paper.

OBJECTS OF THE INVENTION

An object of the present invention is to provide an emulsion-painted wallpaper remover which will soften hardened emulsion paint and like substances to facilitate the removal of the paint and underlying wallpaper.

A further object of the invention is to provide a less laborious method of removing emulsion-painted wallpaper than has previously been available.

SUMMARY OF THE INVENTION

According to one aspect of the present invention there is provided a non-caustic emulsion-painted wallpaper remover for removing wallpaper having a hardened coating of an emulsion paint containing plastics binder resin, comprising:

at least one organic compound capable of plasticizing said plastics resin, each said at least one compound having a flash point above 35° C., a boiling point above 120° C. and an evaporation number greater than 30, based on the evaporation number of diethyl ether being 1;

an emulsifying agent; and a thickening and suspending agent, said at least one compound constituting from 35% to 90% by weight of said emulsion-painted wallpaper remover.

The organic compound employed in the emulsion-painted wallpaper remover of the present invention may comprise a plasticizer, as such, for the paint binder resin or alternatively may comprise a solvent for the resin in such quantities that it will plasticize the resin rather than dissolve it completely to allow its removal as a coherent layer together with underlying wallpaper. To this end, the proportion of solvent in the wallpaper remover is carefully regulated to give this desired result when it is used in accordance with the method of the present invention, as will be described below.

Domestic emulsion paints, in common use, contain various binder resins such as polyvinyl acetate, polyvinyl chloride, polyacrylates, vinyl acetate-ethylene copolymers, vinyl acetate-acrylate copolymers and vinyl acetate-ethylene-vinyl chloride terpolymers. Many washable wallpapers, other than vinyl papers, also have a coating containing one of the above binder resins, and particularly acrylic, polyvinyl acetate and polyvinyl chloride resins. Such coatings are applied to the wallpaper during manufacture, in the form of an emulsion, but without the pigments and fillers of the domestic emulsion paint, to provide a transparent, water-resistant surface film.

The wallpaper remover according to the invention is therefore useful both for removing paper coated with a domestic emulsion paint and for removing the washable papers described above and it may include a single solvent or plasticizer capable of plasticizing a wide range of the polymers mentioned above or a plurality of compounds each capable of plasticizing one or more of the above polymers.

A further use of the present wallpaper remover is in the removal of flock wallpapers formed by spraying short fibres on to a wet adhesive printed on to a wallpaper. Once dry, the adhesive again provides a water-resistant barrier which prevents easy removal of the paper by the usual methods, but since the adhesives normally contain resins of the types described above they can be softened by the compounds present in the wallpaper remover according to the invention to facilitate the removal of the paper.

Since wallpapers are commonly used over large areas of wall or ceiling, a considerable quantity of wallpaper remover is required at any one time. The solvents and plasticizers provided in a painted wallpaper remover according to the present invention are chosen for their high boiling points and low vapour pressures at normal room temperature to reduce their evaporation, in use, and also for their relatively high flash point, low toxicity in the proportions and combinations used, and their mild odour, this combination of characteristics allowing their safe use in large quantities and/or in confined spaces. A wallpaper remover according to the invention for use in removing wallpaper coated with an emulsion paint thus incorporates solvents and/or plasticizers which are relatively safe and pleasant to use as compared with known paint removers, which have been developed primarily for removing the more resistant gloss paints, and which often contain noxious, highly volatile and/or inflammable solvents.

The provision of solvents and plasticizers with low vapour pressures in the present paper remover also renders them more efficient as less of the active compounds evaporates during a prolonged period of soaking of the painted wallpaper, in use.

Solvents which have been found useful for incorporation in a painted wallpaper remover according to the present invention are glycol ethers, esters and alcohols having a boiling point above 120° C., a flash point above 35° C. and an evaporation number greater than 30 (based on the evaporation number of diethyl ether = 1).

Examples of suitable plasticizers for the present invention, that is, substances capable of penetrating a hardened emulsion paint layer and plasticizing the binder resin, are as follows: dibutyl phthalate, tricresol phosphate, tributyl phosphate, triethylene glycol dicaprylate, di-tridecyl phthalate, certain di-alkyl adipate and tri-alkyl trimellitate compounds and esters of phthalate nylonate.

Examples of suitable solvents for the present invention are given in the following table wherein M = miscible and I = immiscible:

|  | Water Miscibility | Flash Point °C. | Evaporation Number (diethyl ether = 1) | Boiling Range °C. |
| --- | --- | --- | --- | --- |
| GLYCOL ETHERS | | | | |
| Ethylene glycol monomethyl ether (1-methoxy-2-hydroxyethane) | M | 38 | 34 | 122–127 |
| Ethylene glycol monoethyl ether (1-ethoxy-2-hydroxyethane) | M | 42 | 43 | 132–137 |
| Diethylene glycol monomethyl ether (2-hydroxy-2'-methoxy-diethyl ether) | M | 87 | 900 | 190–196 |
| Diethylene glycol mono-n-butyl ether (2-hydroxy-2'-butoxy-diethyl ether) | M | 98 | 1200 | 226–234 |
| Diethylene glycol dimethyl ether di (2-methoxyethyl) ether | M | 57 | 90 | 155–165 |
| Ethylene glycol mono-n-butyl ether (1-n-butoxy-2-hydroxyethane) | M | 60 | 160 | 167–173 |
| "Dalpad A" (aromatic glycol ether) | I | 129 | | 245–275 |
| Diethylene glycol mono-ethyl ether (2-hydroxy-2'-ethoxy-diethyl ether) | M | 90 | 1200 | 196–204 |
| Butoxy-ethoxypropanol | | | | |
| Triethylene glycol monoethyl ether | | | | |
| Triethylene glycol mono-n-butyl ether | | | | |
| ESTERS | | | | |
| Ethylene glycol monomethyl ether acetate (2-methoxy ethyl acetate) | M | 44 | 34 | 142–148 |
| Ethylene glycol monoethyl ether acetate (2-ethoxy ethyl acetate) | 28% | 51 | 60 | 152–158 |
| Glycollic acid n-butyl ester | 25% | 75 | 460 | 186–200 |
| 3-Methoxy-n-butyl acetate | 3% | 60 | 75 | 169–173 |
| Diethylene glycol mono-n-butyl ether acetate (2-butoxy-2'-acetoxy-diethyl ether) | 5% | 108 | 1200 | 244–250 |
| 2,2,4-trimethyl-3-hydroxypentyl isobutyrate | I | 120 | | 244 |
| ALCOHOLS | | | | |
| Diacetone Alcohol | M | 58 | 135 | 162–169 |
| Tetrahydrofurfuryl alcohol | M | 74 | 190 | 178 |
| Diethylene glycol | | | | |

In use, the wallpaper remover according to the invention is applied to an emulsion-painted wallpaper using a convenient applicator such as a paint brush or paint roller. After a period of time depending on the nature and thickness of the paint, but normally between 15 minutes and 24 hours, to allow the organic compound to act on the emulsion paint binder resin, the plasticized paint may then be removed. Sufficient paint remover is preferably applied effectively to plasticize the paint, forming a pliable, cohesive film which can be removed in strips and which adheres to the wallpaper such that at least the upper layer of paper is removed with the paint; it has been found that an application of approximately 20% by weight of the organic compounds per weight of emulsion paint binder resin gives very good results.

Water, either incorporated in the wallpaper remover or added subsequently, is preferably also applied to the painted wallpaper prior to its removal in order to soften the backing adhesive and release the paper from the supporting surface; the softening of the paint film due to the action of the present wallpaper remover allows penetration of the water into the paper for this purpose. Alternatively the said solvents provided in the wallpaper remover may themselves be solvents for the wallpaper adhesive, in which case no water would be required.

The softened paper and adhesive, together with any remaining paint film, may be removed by scraping in the usual manner for non-painted wallpaper.

A painted wallpaper remover according to the invention may, for some applications, simply comprise the active solvents and/or plasticizers, a thickening and suspending agent and an emulsifying agent, but for most uses it preferably includes up to 50% by weight of inert filler to improve its spreading capacity. Alternatively, or in addition, it may contain a diluent, such as water, the inert filler and water preferably comprising less than 75% by volume of the paper remover. The inclusion of an inert filler or diluent is useful both for economic reasons and to prevent the application of a high concentration of active compound to a small surface area, although alternatively, a concentrated paint remover according to the invention may be diluted with water immediately prior to use.

Inert fillers which are useful for the present purpose are, for example, finely ground clay, chalk, talc and asbestine.

The suspending and thickening agent in the present wallpaper remover has the function of thickening the wallpaper remover to assist the spreading capacity of the active compounds in embodiments containing little or no inert filling material. It also assists the retention of an inert filler or powdered emulsifying agent in suspension in embodiments containing such particles. Suitable suspending and/or thickening agents are emulsifying waxes, high molecular weight polyethylene glycols, cellulosic polymers, such as hydroxypropyl cellulose, and surface treated clays, such as, in the case of a wallpaper remover containing water as a diluent, a magnesium montmorillonite.

The thickening and suspending agent may constitute up to 10% by weight of the present wallpaper remover.

The thickening and suspending agent has the added advantage of helping to prevent evaporation of the solvent during soaking of the wallpaper, although up to 10% by weight of at least one humectant, such as glycerine, propylene glycol or polyethylene glycol is preferably included for this purpose.

The emulsifying agent provided in the present wallpaper remover assists the solvent or solvents to reemulsify the the paint layer to facilitate its removal. In addition, the emulsifying agent is preferably a detergent or wetting agent which can assist the penetration of water, or another suitable solvent, through the paper to soften the wallpaper adhesive so that the paper can be scraped from the wall in the usual manner.

In compositions containing solvents and/or plasticizers immiscible with each other or with water, an emulsifying agent is chosen which can also stabilize the composition and in such cases, the emulsifying agent may constitute up to 40% by weight of the wallpaper remover. If this additional stabilizer action is not required, however, much lower emulsifying agent contents may be used, of, for example, up to 5% by weight. Examples of suitable emulsifying agents for wallpaper removers according to the invention are: a substituted ethylene oxide condensate, an alkyl phenol ethoxylate, a fatty alcohol sulphate, and a fatty acid amide of diethanolamine; emulsifying waxes act both as thickening and suspending agents and as emulsifying agents.

A painted wallpaper remover according to the invention may also include a reodorant such as a high-boiling terpene oil, for example, pine oil.

METHOD OF USE

According to a further aspect of the present invention there is provided a method for removing, from a supporting surface, wallpaper having a surface coating of emulsion paint containing a plastics binder resin, wherein said method includes the steps of:

applying an emulsion-painted wallpaper remover to said surface coating, leaving said wallpaper remover to plasticize said binder resin to form a cohesive, pliable paint film and thereafter, scoring said paint film and underlying paper with a sharp instrument, raising the edge of said paint film and adhering paper adjacent the score mark and pulling the raised edge away from said supporting surface to remove a strip of said paint film and adhering paper progressively from said surface, said wallpaper remover comprising: at least one organic compound capable of plasticizing said plastics resin, each said at least one compound having a flash point above 35° C., a boiling point above 120° C. and an evaporation number greater than 30, based on the evaporation number of diethyl ether being 1; an emulsifying agent; and a thickening and suspending agent, said at least one compound constituting from 35% to 90% by weight of said emulsion-painted wallpaper remover.

In the case of wallpaper coated with several layers of emulsion paint it may take several hours for the wallpaper remover to plasticize the paint layer and it is preferably left to act on the paint film overnight.

Unless the paint surface comprises a large number (more than eight) coats of paint it should be possible to remove all the layers of paint and the outermost layer of paper with a single application of the painted wallpaper remover according to the invention, the thickness of the application and time between application and removal depending on the number of coats to be removed. If necessary, however, one or more further applications of the wallpaper remover may be made, sufficient time being allowed after each application for the solvents to act on the paint film before the paint is removed.

The backing layer of paper and adhesive attaching it to the supporting surface must be removed in a subsequent step. After the paint layer has been softened by the preset wallpaper remover, water, or other solvent for the adhesive present in the wallpaper remover can penetrate the paint layer to soften the backing paper and adhesive to allow its removal in the usual manner. If the present wallpaper remover contains little or no water, or other solvent for the adhesive, water may be applied to the wallpaper separately, preferably after the paint has been softened. The detergent or wetting action of the preferred emulsifying agents present in the wallpaper remover assists the penetration of the water or other solvent through the paper to soften the adhesive.

The above method of removal is also suitable for washable wallpapers of the duplex type, comprising two bonded layers having a relatively thick resin coating, the upper layer being removable with the softened resin film. In the case of poorer quality, simplex papers comprising a single layer of paper and having a very thin coating of plastics resin, the softened film is unlikely to be sufficiently cohesive for it to be removed in strips; after the film has been softened with the aid of the present wallpaper remover, however, a solvent for the backing adhesive, for example, water, applied after the softening process, readily penetrates the resin film to soften the backing adhesive so that the paper can be removed by scraping in the usual manner. A flock wallpaper having a discontinuous flock pattern must also be removed in this manner.

A wallpaper remover according to the invention may also be used to remove wallpaper coated with distemper or for non-coated wallpaper but since the strong solvent power of the constituent solvents would not, in these cases, be required the wallpaper remover may be considerably diluted, for example with four times its volume of water, before use.

Since the solvents and plasticizers in the wallpaper remover are chosen for their ability to plasticize emulsion paint resins, the wallpaper remover may also be used to remove emulsion paint per se: it is particularly useful for removing textured emulsion paints, that is, heavy bodied emulsion paints having poor flow characteristics, which are applied thickly to a wall or ceiling and given a textured finish and which are difficult to remove by known methods. To remove such paints, the present wallpaper remover would be applied with, for example, a brush and would be left for at least 15 minutes and preferably several hours for the solvents to soften the paint binder resins. The softened paint may then be removed by scraping with a knife or scraper.

EXAMPLES OF PREFERRED EMBODIMENTS

Several embodiments of emulsion painted wallpaper removers according to the invention will now be more particularly described by way of example:

EXAMPLE 1

An emulsion paint remover according to the present invention has the following composition by weight:

| Ingredient | % by weight | Function |
| --- | --- | --- |
| hydroxypropyl cellulose | 1 | thickening agent |
| tetrahydrofurfuryl alcohol | 25 | high boiling alcohol solvent |
| diethylene glycol mono-n-butyl ether | 25 | glycol ether solvent |
| ethylene glycol mono-ethyl | 25 | glycol ester |

| Ingredient | % by weight | Function |
| --- | --- | --- |
| ether acetate | | solvent |
| alkyl phenol ethoxylate | 2 | emulsifying agent |
| pine oil | 5 | reodorant |
| water | 17 | diluent |

EXAMPLE 2

An emulsion painted wallpaper remover according to the present invention has the following composition by weight:

| Ingredient | % by weight | Function |
| --- | --- | --- |
| hydroxypropyl cellulose | 1 | thickening agent |
| tetrahydrofurfuryl alcohol | 30 | high boiling alcohol solvent |
| diethylene glycol monomethyl ether | 30 | glycol ether solvent |
| glycollic acid n-butyl ester | 30 | high boiling ester solvent |
| a fatty alcohol condensate of ethylene oxide | 4 | emulsifying agent |
| high boiling terpene oil | 5 | reodorant |

EXAMPLE 3

A third embodiment of an emulsion painted wallpaper remover according to the present invention has the following composition by weight:

| Ingredient | % by weight | Function |
| --- | --- | --- |
| hydroxypropyl cellulose | 0.5 | suspending agent |
| diethylene glycol mono-n-butyl ether acetate | 48 | high boiling ester solvent |
| a fatty alcohol sulphate | 2 | emulsifying agent |
| pine oil | 5 | reodorant |
| finely ground clay, talc, chalk or asbestine or a mixture of two or more of these | 44.5 | inert filling material |

EXAMPLE 4

A fourth embodiment of an emulsion painted wallpaper remover according to the present invention has the following composition by weight:

| Ingredient | % by weight | Function |
| --- | --- | --- |
| hydroxypropyl cellulose | 0.5 | suspending agent |
| tetrahydrofurfuryl alcohol | 10 | solvent |
| diethylene glycol mono-n-butyl ether acetate | 25 | solvent |
| pine oil | 5 | reodorant |
| ethylene oxide fatty alcohol condensate | 2 | emulsifying agent |
| ground chalk | 20 | inert filler |
| fine ground clay | 10 | inert filler |
| water | 27.5 | diluent |

The compositions of Examples 1 to 4 are made by simple mechanical mixing. More particularly, the compositions of Examples 2 and 4 are made by adding the hydroxypropyl cellulose slowly to the diethylene glycol solvent, with continual mixing. When these are fully dispersed, the tetrahydrofurfuryl alcohol is added and the mixture is stirred until a clear solution is obtained. The remainder of the ingredients are then added in the order shown, the viscosity being adjusted to around 5 poise/20° C. (using an ICI ROTOTHINER) by varying the water content slightly to allow for batch variations in the quality of the ingredients.

EXAMPLE 5

A fifth embodiment of a wallpaper remover according to the invention has the following composition:

| Ingredient | % by weight | Function |
| --- | --- | --- |
| butyl diglycol (2-butoxy-2'-hydroxy-diethyl ether) | 15.0 | solvent |
| n-butyl ester of glycollic acid | 35.0 | solvent |
| KLUCEL H an hydroxypropylcellulose of Hercules Chemicals Limited | 0.3 | thickening agent |
| glycerine | 5.0 | humectant |
| EMPILAN KA5 made by Albright & Wilson Limited. | 1.0 | emulsifying agent |
| fine clay (FPC) | 41.7 | inert filling |
| pine oil | 2.0 | reodorant |

The composition is made by premixing the KLUCEL H and glycerine and adding them, with stirring, to the premixed solvents. The mixture is allowed to stand for about one hour until a clear sol is obtained.

The other ingredients are then added separately, with stirring in the order: pine oil; EMPILAN KA5; fine clay.

EXAMPLE 6

A further embodiment of a wallpaper remover according to the present invention has the following composition:

| Ingredient | % by weight | Function |
| --- | --- | --- |
| diethylene glycol mono-n-butyl ether | 25.00 | solvent |
| tetrahydrofurfuryl alcohol | 12.00 | solvent |
| diethylene glycol mono-n-butyl ether acetate | 12.00 | solvent |
| hydroxypropyl cellulose | 0.5 | thickening agent |
| glycerine (Technical grade) | 1.25 | humectant |
| ethylene oxide fatty alcohol condensate | 2.5 | emulsifying agent |
| fine particle size natural ground chalk | 12.0 | inert filler |
| fine particle size natural ground china clay | 12.0 | inert filler |
| water | 19.65 | diluent |
| pine oil | 3.00 | reodorant |
| preservative | 0.1 | to protect cellulose from bacterial action |

The composition is made by first mixing the hydroxypropyl cellulose in a non-solvent, glycerine, to aid dispersion before adding it to the diethylene glycol mono-n-butyl ether and tetrahydrofurfuryl alcohol, with continuous stirring for 15 minutes.

The mixture is allowed to stand for 30 minutes, is stirred again for a further 15 minutes, then allowed to stand for several hours, preferably overnight, to ensure complete solvation of the cellulose.

The other ingredients are then added, with continuous stirring, in the following order: water (12% by weight), ethylene oxide fatty acid condensate, pine oil, chalk, clay, diethylene glycol mono-n-butyl ether acetate, preservative, remaining water (7.65% by weight). Stirring is continued until a homogeneous mixture is formed.

The viscosity is adjusted to a desired value for application (2.5–5.0 poise/20° C., when tested on an ICI Rotothinner) by varying the quantity or grade of hydroxypropyl cellulose.

Stirring is carried out with conventional agitators, for example, a 'disc-blade impeller', in an open tank under cool conditions.

EXAMPLE 7 and 8

A further embodiment of a wallpaper remover according to the invention has the following composition by weight:

| Ingredient | Example 7 % by weight | Example 8 % by weight | Function |
|---|---|---|---|
| KLUCEL H (Registered Trade Mark) | 0.55 | 0.5 | thickening agent |
| Glycerine | 1.21 | 1.3 | humectant |
| Diethylene glycol mono-n-butyl ether | 24.24 | 26.2 | solvent |
| Diethylene glycol mono-n-butyl ether Acetate | 12.12 | 13.1 | solvent |
| Water | 19.46 | 13.0 | diluent |
| Tetrahydrofurfuryl alcohol | 12.12 | 13.1 | solvent |
| Pine oil | 3.03 | 3.3 | reodorant |
| EMPILAN CDE (Registered Trade Mark) | 3.03 | 3.3 | emulsifying agent |
| Ground Whiting | 12.12 | 13.1 | inert filler |
| Fine china clay | 12.12 | 13.1 | inert filler |

EXAMPLES 9 and 10

Two further embodiments of a wallpaper remover according to the present invention have the following compositions:

| Ingredient | Example 9 % by weight | Example 10 % by weight | Function |
|---|---|---|---|
| KLUCEL H (Registered Trade Mark) | 0.55 | 0.55 | thickening agent |
| Diethylene glycol mono-n-butyl ether | 24.24 | 12.12 | solvent |
| Water | 12.12 | 12.12 | diluent |
| Dibutyl phthalate | 12.12 | 38.21 | plasticizer |
| Pine Oil | 20.73 | 5.26 | reodorant |
| EMPILAN CDE (Registered Trade Mark) | 5.00 | 5.00 | emulsifying agent |
| SYNPERONIC NX (Registered Trade Mark (an alkyl phenol ethoxylate) | 1.00 | 2.50 | emulsifying agent |
| Ground whiting | 12.12 | 12.12 | inert filler |
| Fine china clay | 12.12 | 12.12 | inert filler |

The composition of Example 10 has been chosen to combine good softening power of the plasticizer with very low toxicity.

EXAMPLE 11

| Ingredient | % by weight | Function |
|---|---|---|
| "BENTONE" gellant (a montmorillonite) | 2 | thickening and suspending agent |
| Industrial methylated spirits | 1 | |
| Dibutyl phthalate | 38 | plasticizer |
| Butyl diglycol | 12 | solvent |
| Pine oil | 5 | reodorant |
| EMPILAN CDE | 5 | emulsifying agent |
| SYNPERONIC NX | 2.5 | emulsifying agent |
| Ground whiting | 10 | inert filler |
| Fine china clay | 10 | inert filler |
| Water to | 100 | diluent |

The "BENTONE" gellant is made into a 15% paste with the industrial methylated spirits and the dibutyl phthalate under high shear conditions. The other ingredients are then added slowly.

EXAMPLE 12

| Ingredient | approx. % by weight | Function |
|---|---|---|
| Di-isobutyl phthalate | 34. | plasticizer |
| Diethylene glycol mono-n-butyl ether | 10.7 | solvent |
| Water | 16 | diluent |
| Ground whiting Snocal 6ML | 18 | inert filler |
| China clay FPC | 14 | inert filler |
| SYNPERONIC NP8 (nonyl phenol ethoxylate) | 2 | emulsifying agent |
| EMPILAN CDE | 4.5 | emulsifying agent |
| Ethyl cellulose | 0.75 | thickening and suspending agent |
| 36% formalin solution | 0.05 | preservative |

In the Examples EMPILAN CDE is a fatty acid amide of diethanolamine made by Albright & Wilson Limited, and SYNPERONIC NP8 and NP20 are nonyl phenol ethoxylate condensates made by I.C.I. Ltd.

EXAMPLE 13

An embodiment of this invention which combines a water-immiscible solvent and/or plasticizer with water as a diluent, with the aid of a greater proportion of emulsifying agent to stabilize the mixture may have one of the following general compositions:

| Ingredient | % by weight |
|---|---|
| A | |
| Water immiscible solvent and/or plasticizer such as dibutyl phthalate | 50 |
| Low HLB emulsifier such as SYNPERONIC NX (Registered Trade Mark) | 16 |
| High HLB emulsifier such as EMPILAN CDE | 16 |
| Water | 18 |
| B | |
| Water immiscible solvent such as DALPAD A of the DOW Chemical Corporation and Dibutyl phthalate | 42 |
| Low HLB emulsifying wax such as LANETTE Wax SX (Registered Trade Mark) | 22 |
| High HLB emulsifier such as SYNPERONIC NP 20 (Registered Trade Mark) (a nonylphenol ethoxylate)) | 18 |
| Water | 18 |

Compositions A and B are made by mixing the cold ingredients, possibly with the addition of clay and chalk fillers. The emulsifiers also act as thickening and suspending agents. The term HLB relates to the hydrophylic-lyophobic properties of the emulsifier, a compound having a high HLB value being miscible with water but not with non-polar solvents and vice versa.

| Ingredients | % by weight |
|---|---|
| C | |
| Water immiscible solvent such as DALPAD A (Registered Trade Mark) and Dibutyl phthalate | 28 20 |
| Low HLB emulsifying wax such as LANETTE Wax SX (Registered Trade Mark) | 18 |
| High HLB emulsifier such as SYNPERONIC NP 20 (Registered Trade Mark) (a nonylphenol ethoxylate) | 12 |
| Water | 14 |
| China Clay | 8 |

The composition is prepared by mixing and heating the SYNPERONIC NP 20 and the water to 50° C. and mixing and heating the LANETTE wax and dibutyl phthalate separately to 50° C. The latter oil phase is then added to the water phase with constant stirring until it has cooled to below 30° C. Finally the DALPAD A and china clay are added with stirring.

The following test was carried out with the above compositions of Example 11 and with a known wallpaper remover in which the solvent content was increased to a level comparable to that of the wallpaper remover according to the invention. The composition of the known remover for comparison was:

| Ingredient | % by weight |
|---|---|
| diethylene glycol mono-n-butyl ether | 50 |
| detergent (e.g. TEEPOL 610, Registered Trade Mark) | 12.5 |
| water | 37.5 |

METHOD FOR TESTING EMULSION PAINTED WALLPAPER REMOVER

Preparation of standard test panel 5 coats of emulsion paint were applied evenly by brush to a stiff cardboard panel at the rate of 10 sq. meters per liter (1 ml per 100 sq. cms.), per coat. The coats were allowed to dry for 24 hours at normal room temperature and humidity between each coat. Each coat was of a different brand and different colour of domestic-type emulsion paint. A section of each colour was left clear of subsequent coats on the finished panel.

The test panel was allowed to harden thoroughly at normal room temperature for three months before use. Alternatively, the panel may be stored at 40° C. for one week, the panel being cooled before use. During hardening good air circulation was ensured to evaporate all the volatile compounds from the emulsion paint film.

Application of test formulation

The Wallpaper Remover was applied to the test panel by brush, to give an even coverage over all colours, at the rate of 1 ml per 100 sq. cms. Immediately after application, the test panel was placed in a vertical position.

The properties of the formulation were noted for ease of application, without brush drag, to give a smooth, even film, which, on standing in the vertical position, does not run or sag.

Assessment of formulation

The effectiveness of the formulation was tested after suitable time intervals of 4 hours, 8 hours, overnight (15-16 hours) and 36 hours, by scratching with a thumb nail, to remove the top layers of emulsion paint where they have been softened and reveal, by the colour code, the number of coats penetrated and the time taken.

When all five coats were softened, the surface was moistened with water. After 15 minutes, the water should penetrate through to the underlying cardboard.

A satisfactory formulation will penetrate and soften all five coats of emulsion paint after 8 hours and overnight, will dry out sufficiently to leave the film soft, flexible, easy to handle without stickiness and easy to penetrate with water by simple sponging.

The same assessment can be used to test the effectiveness of the formulation to remove washable wallpapers (wallpaper coated with an emulsion glaze) and emulsion based textured paints.

It was found that the compositions according to the invention which were tested gave satisfactory results whereas the composition tested for comparison penetrated only the upper paint layers in the first 8 hours of testing and did not give a pliable film; the paint films tended to chip when scratched. When tested after being left overnight, the paint film to which the composition according to the invention was applied was pliable and easily removable from the board whereas that tested with the composition for comparison was nearly dry, the solvent having evaporated.

What is claimed is:

1. A method for removing, from a supporting surface, wallpaper having a surface coating of emulsion paint containing a plastics binder resin, wherein said method includes the steps of:
    applying an emulsion-painted wallpaper remover to said surface coating,
    leaving said wallpaper remover to plasticize said binder resin to form a cohesive, pliable paint film and thereafter,
    scoring said paint film and underlying paper with a sharp instrument,
    raising the edge of said paint film and adhering paper adjacent the score mark and pulling the raised edge away from said supporting surface to remove a strip of said paint film and adhering paper progressively from said surface, said wallpaper remover consisting essentially of: at least one organic compound capable of plasticizing said plastics resin, each said at least one compound having a flash point above 35° C., a boiling point above 120° C. and an evaporation number greater than 30, based on the evaporation number of diethyl ether being 1; an emulsifying agent; and a thickening and suspending agent.

2. A method for removing, from a supporting surface, wallpaper having a surface coating of emulsion paint containing a plastics binder resin, said method including the steps of:
    a. applying to said surface coating an emulsion wallpaper remover consisting essentially of:
    at least one organic compound capable of plasticizing said plastics resin, each said at least one compound having a flash point above 35° C., a boiling point above 120° C. and an evaporation number greater than 30, based on the evaporation number of diethyl ether being 1; an emulsifying agent; and a thickening and suspending agent, said at least one organic compound, said emulsifying agent and said thickening agent being combined in such quantities that said emulsion-painted wallpaper remover can be spread and left on said surface coating and will soften said coating to form a coherent, pliable paint film;

b. leaving the thus applied wallpaper remover in contact with said surface coating to plasticize said surface coating to form a coherent, pliable paint film; and thereafter, c. scoring said paint film and underlying paper with a sharp instrument; and d. raising the edge of said paint film and adhering paper adjacent the score mark and pulling the raised edge away from said supporting surface to remove a strip of said paint film and adhering paper progressively from said surface.

3. A method for removing, from a supporting surface, wallpaper having a surface coating of emulsion paint containing a plastics binder resin, said method including the steps of:

a. applying to said surface coating an emulsion painted wallpaper remover consisting essentially of:

(1) from 35% to 90% by weight of at least one organic compound capable of plasticizing said plastics resin, each said at least one compound having a flash point above 35° C., a boiling point above 120° C. and an evaporation number greater than 30, based on the evaporation number of diethyl ether being 1;

(2) from 1% to 40% of an emulsifying agent;

(3) From 0.3% to 40% by weight of a thickening and suspending agent, provided that components (1), (2) and (3) are present in quantities such that said emulsion-coated wallpaper remover can be spread and left on said surface coating and will soften said coating to form a coherent, pliable paint film;

B. leaving the thus applied wallpaper remover in contact with said surface coating to plasticize said surface coating to form a coherent, pliable paint film;

C. scoring said paint film and underlying paper with a sharp instrument; and

D. raising the edge of said paint film and adhereing paper adjacent to the score mark and pulling the raised edge away from said supporting surface to remove a strip of said paint film and adhering paper progressively from said surface.

4. The method according to claim 2 wherein said at least one organic compound is a solvent for said plastics resin, said solvent being present in said emulsion-painted wallpaper remover in a quantity capable of plasticizing said plastics resin.

5. The method according to claim 2 or 3, wherein the at least one organic compound (1) is a solvent for said plastics resin and is selected from the group consisting of ethylene glycol monomethyl ether; ethylene glycol mono-ethyl ether; diethylene glycol monomethyl ether; diethylene glycol mono-n-butyl ether; diethylene glycol dimethyl ether; ethylene glycol mono-n-butyl ether; diethylene glycol mono ethyl ether; butoxy-ethoxy propanol; triethylene glycol monoethyl ether; ethylene glycol mono ethyl ether acetate; ethylene glycol monomethyl ether acetate; glycollic acid n-butyl ether; 3-methoxy-n-butyl acetate; diethylene glycol mono-n-butyl ether acetate; 2,2,4-trimethyl-3-hydroxpentyl isobutyrate; diacetone alcohol; tetrahydrofurfuryl alcohol; and triethylene glycol mono-n-butyl ether.

6. The method according to claim 3 or 2, wherein said at least one organic compound (1) is a plasticizer for the resin selected from the group consisting of dibutyl phthalate, tricresol phosphate, tributyl phosphate, triethylene glycol dicaprylate and di-tridecyl phthalate.

7. The method according to claim 2, wherein said emulsifying agent constitutes up to 40% by weight of said wallpaper remover.

8. The method according to claim 2 or 3, wherein said emulsifying agent (2) is selected from the group consisting of a substituted ehtylene oxide condensate, an alkyl phenol ethoxylate; a fatty alcohol sulphate and a fatty acid amide of diethanolamine.

9. The method according to claim 2, wherein said thickening and suspending agent constitutes up to 40% by weight of said emulsion-painted wallpaper remover.

10. The method according to claim 3, wherein said thickening and suspending agent is selected from the group consisting of an emulsifying wax, a cellulosic polymer, a surface treated clay and a high molecular weight polyethylene glycol.

11. A method according to claim 10, wherein said cellulosic polymer is hydroxypropyl cellulose.

12. The method according to claim 3, wherein said wallpaper remover further includes up to 50% by weight of inert filler.

13. The method according to claim 12, wherein said inert filler comprises at least one member selected from the group consisting of a finely ground state clay, chalk, talc and asbestine.

14. The method according to claim 3, wherein said wallpaper remover further includes a diluent.

15. The method according to calim 14, wherein said diluent is water.

16. The method according to claim 3, wherein said wallpaper remover further includes up to 10% by weight of at least one humectant.

17. The method according to claim 16, wherein said at least one humectant is selected from the group consisting of glycerine, propylene glycol and a polyethylene glycol.

18. The method according to claim 3, wherein said wallpaper remover further includes a reodorant.

19. The method according to claim 18, wherein said reodorant is a terpene oil.

* * * * *